US006988280B2

(12) United States Patent
Burnett

(10) Patent No.: US 6,988,280 B2
(45) Date of Patent: Jan. 17, 2006

(54) SYSTEM AND METHOD FOR ENHANCING AUTHORIZATION REQUEST IN A COMPUTING DEVICE

(75) Inventor: Rodney C. Burnett, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 09/895,090

(22) Filed: Jun. 29, 2001

(65) Prior Publication Data

US 2003/0028798 A1 Feb. 6, 2003

(51) Int. Cl.
*G06F 12/14* (2006.01)

(52) U.S. Cl. .......................... 726/17; 726/21; 713/166; 713/182; 709/229

(58) Field of Classification Search ................ 713/165, 713/166, 167, 182, 185, 200, 202; 707/9; 709/104, 217, 219, 226, 229; 711/123; 726/5, 726/17, 21
See application file for complete search history.

(56) References Cited

U.S. PATENT DOCUMENTS 5,889,952 A * 3/1999 Hunnicutt et al. .......... 709/219
2002/0002577 A1 * 1/2002 Garg et al. ................. 709/104

* cited by examiner

*Primary Examiner*—Justin T. Darrow
(74) *Attorney, Agent, or Firm*—Duke W. Yee; Jeffrey S. LaBaw; Wayne P. Bailey

(57) ABSTRACT

The invention is directed to a caching system for authorization requests. The authorization request is intercepted by a authorization manager. The manager searches in a cache for matching request criteria. If found, the manager returns the result of the request based on the cache information. If not, the normal authorization techniques may be implemented in an associated authorization protocol, whereby the results of the authorization are returned to the requesting party. However, the results of the protocol are also stored in the cache, where they may be found by a later user.

25 Claims, 4 Drawing Sheets

SYSTEM AND METHOD FOR ENHANCING AUTHORIZATION REQUEST IN A COMPUTING DEVICE

FIELD OF THE INVENTION

The present invention is directed to file authorization techniques. In particular, it is directed to a system and method which authorization results are cached by parameter keys, allowing an authorization request to be processed quickly.

BACKGROUND OF THE INVENTION

In a system with a fine grained robust security model, the processing required to make authorization decisions can be intensive. For example, a security model with access control lists (ACL's) could contain large numbers of ACL entries. An authorization decision would potentially require evaluating each entry in the ACL against the security protections to reach a result.

If the model also supported concepts such as time of day restrictions, or accessing application rules, computational costs would be further increased. Finally if the authorization engine was external, required system process context switches, or utilized network services, the cost for full authorization processing would become substantially greater.

In processing systems, there are often resources that are frequently and repeatedly accessed. This trait is very common in computing file systems where a core set of file system resources are repeatedly access for recurring tasks such as invoking programs, accessing user attributes, or accessing network services. Some examples from the UNIX operating system include, /etc/passwd, /etc/group, /etc/hosts, and /usr/lib/libc.a. This can be especially true in a security model that supports inheritance of policy along a hierarchical path to a resource. With an inheritance model, an access control list (ACL) would control the authorization for a directory. That ACL would apply all file resources lacking a specific ACL which reside the below the protected directory in the file tree. In this case, one ACL defines access on a large number of file system resources.

In the context of authorization of resources, typical prior solutions employ a brute force method. When a user requests a certain resource, the operating system must determine the applicability of the request based on many parameters. These parameters include the user, the application being used, the actual resource requested, time constraints, and location constraints, wherein a user may only use certain resources through usage at or through a certain computing device.

Some systems employ complex authorization control lists to simply search for authorization rules and guidelines. Others may employ database methods or built in scripting services to perform the same function. When many parameters are used, these solutions prove inefficient both in time and effort. When a single machine is used for authorization decisions for a network of machines, the complexity rises immensely.

Additionally, these solutions only employ these roles in a rote way. As such, a user must initiate the authorization process all over again when he breaks in the action. As such, the time that the system could use elsewhere is dedicated to reformulating authorizations all over again needlessly.

In some systems, the authorizations are on a resource by resource basis. Others may use inherited authorization techniques, wherein a directory contains a file describing the appropriate authorization parameters for unattached files in directories below it. In other uses, a combination scheme employing two or more parameters, such as the ones described above, may be used.

As noted, the authorization schemes of many typical solutions have problems associated with computational efficiency. Many other problems and disadvantages of the prior art will become apparent to one skilled in the art after comparing such prior art with the present invention as described herein.

SUMMARY

Aspects of the invention are found in a system for authorization caching that learns from prior usage. When a user requests a resource, the system searches a cache for that particular usage. When the cache hits an already developed authorization permission, the cache returns that signal.

If there is no record applicable in the cache, then the full authorization procedure is performed. The results are then stored in the authorization cache. Thus, when the same or related request is made, the authorization need not be directly computed, only returned.

In another aspect of the invention, the cache is selectively clearable based on changes in security policy. Thus, when the policy changes as to a particular resource, the entries based on that resource will be cleared. Other aspects of the policy not changed will be preserved in the cache. Thus, the entries for other resources, in this example, will not be affected, and will remain in the cache.

The model also employs the use of binary file identifiers for efficient management and location of cached results. In addition, a method is described for invalidating cached results when changed in might invalidate cached results.

The method involves the following described techniques. When a resource access occurs, the intercepting agent, such as an ACL manager, processes it. The ACL manager determines where the relevant protections are in the resource space for the accessed resource. The ACL manager, then gathers known properties for the protections. For example, the properties would indicate that the protections include time of access restrictions, access application restrictions, or perhaps that the located protection was inherited from a directory along the file system path to the accessed resource. Note that these properties do not require the actual ACL rules to be useful which could avoid additional processing to retrieve the full ACL specification. The ACL manager also generates a binary representation of the file resource known as a file identifier (FID) for the resource where the protections exist. A FID is a finite stream of bytes that uniquely defines the resource. Its small size and numerical nature make it suitable for efficient storage and fast retrieval. This FID information including the above mentioned properties could potentially be constructed when the ACL manager initializes on a system. Assuming the information was pre-processed, the resource names would have been translated into FID information for optimal searching.

Once the ACL manager has identified the protected resource and its associated protection properties for a given resource access, the result cache is consulted using the resource data, resource properties, and access conditions, to see if there are cached results. If not, the decision component of the ACL manager is consulted to generate an authorization decision based on a full evaluation against the ACL specification. The obtained result is then added into the ACL result cache along with information on the protected resource and information about how that resource was selected. For example, if the resource was chosen as inherited policy along the hierarchical path to the resource or if the accessed resource had directly attached security policy. This information is used to build the cache entry and place it in the cache. The cache may be segmented into inherited and direct segments to provided faster searching and spatial efficiency.

As such, the caching allows for dynamic and flexible authorization schemes to be implemented without a corresponding drain on computational time or power. Other aspects, advantages and novel features of the present invention will become apparent from the detailed description of the invention when considered in conjunction with the accompanying drawings.

DESCRIPTION OF THE DIAGRAMS

DETAILED DESCRIPTION OF THE PREFERRED EMBODIMENT

Figure 1:
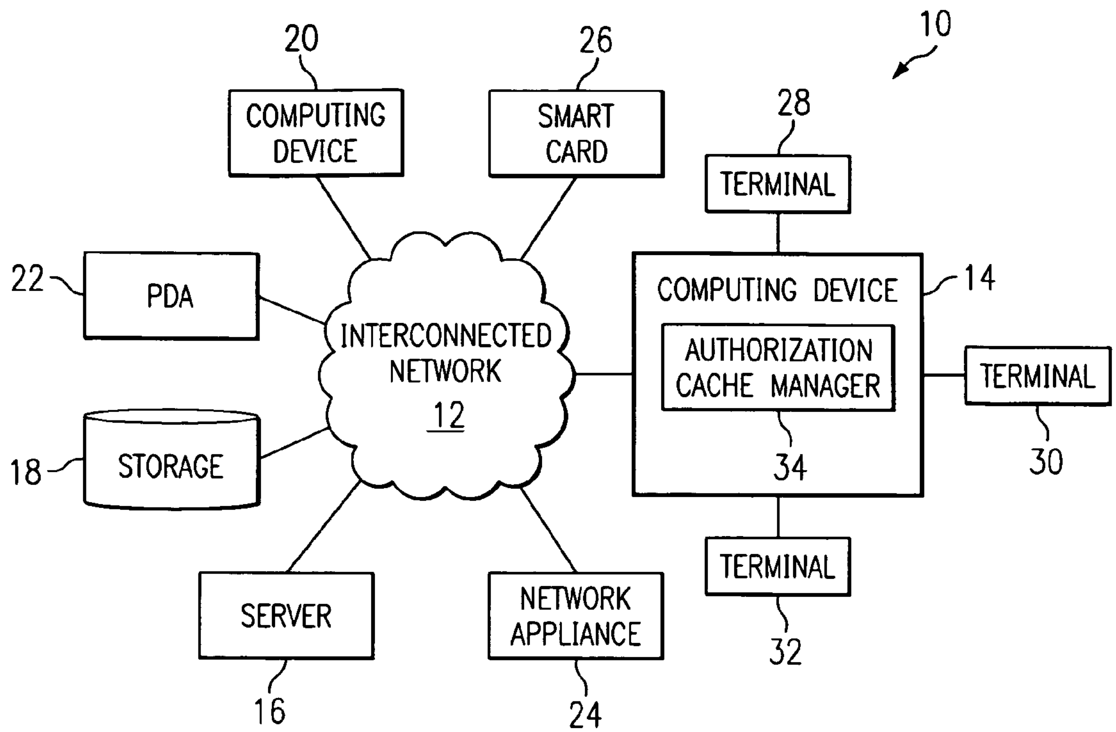
FIG. 1 is a schematic diagram of a typical network of data processing systems that may employ the current invention.

FIG. 1 is a schematic diagram of a typical network of data processing systems that may employ the current invention. Any of the data processing systems of FIG. 1 may implement the present invention. A distributed data processing system 10 contains a network 12. The network 12 provides communications link between all the various devices and computers connected within the distributed processing system 10. The network 12 may include permanent connections, such as wire or fiber optic cables, or other types of connections such as wireless, satellite, or infrared network technology.

The network 12 may operate under a number of different operating schemes. Communications may flow between the associated components of the distributed processing system 10 under various protocols, including TCP/IP. The network 12 may also be indicative of several interconnected networks, such as the Internet.

The network 12 connects a computing device 14 and a server 16. Additionally, a storage unit 18 is also connected to the network 12, thus allowing the computing device 14 and the server 16 to communicate with and store data to and from the storage unit 18. Another computing device 20 may be coupled to the network.

Additional computing components connected to the network 10 may include a personal digital assistant 22 and a remote network appliance 24. Additionally, an individual user may carry a so-called "smart card" 26. The smart card may contain sufficient data and/or processing capabilities to allow connection to and communication with other components of the distributed data processing system 10.

It should also be noted that the distributed data processing system might also include numerous different types of networks. Any one of, or any combination of, for example, an intranet, a local area network (LAN), a wide area network (WAN), or an aggregation of units may be connected to each other in a fashion.

If using the network in a secure fashion, the network may be local to the individual clients. In another manner, such a secure network may be implemented upon a public network using various security protocols, thus creating a virtual secure network (VSN) molded from the public network infrastructure. Also, the present invention may be implemented on a variety of hardware and software platforms, as described above.

The computing device 14 is directly coupled to terminals 28, 30, and 32. The information contained on the computing device 14 or the results of a program executing on the computing device may be transferred to any of the above mentioned terminals or to any of the network coupled devices. The computing device contains an authorization cache manager 34. The authorization cache manager 34 intercepts resource requests from any of the users accessing the computing device. These requests may be requests for information in a file, use of an attached device, use of an executable, or some system level requests.

Security systems regulate access to resources through various parameters. These include the user requesting the resource, the requesting application, the location of the user in relation to the computing device, the location of the resource in the system, and or temporal based restrictions. Most of the parameters are self-explanatory. The determination of access based on users, their location, the location of the requested resource, or temporal based restrictions are common enough.

In the case of requesting application restrictions, different versions of an application may be restricted from various resources. In an explanatory scenario, assume that a company has licensed XY software, version 2. Assume that the files that need to be accessed have some sort of restriction associated with them, such as a patented compression method. Assume that the XY software, version 1 may also process this data, but it remains unlicensed. In order to ensure that no unlicensed activity takes place, an application based restriction may be placed on the specific compressed files that allow access by only those software programs that have licensing protection associated with them.

In the case of file-based operating systems, access to devices may be accomplished by opening the associated "file" in the directory. In this manner, a file id may be a pointer to an associated disk drive, tape drive, facsimile driver, or other external type access port. Thus, access to these resources can be restricted to certain requesting resources. In this manner, administrators can easily define certain access resources, or certain drives, on or off limits to particular requesting resources. For example, an administrator may want to restrict a certain hard drive to particular types of database files. When this happens, a graphic artist may not accidentally overwrite files or access certain physical devices with an inadvertent opening and writing to a particular file existing on the device.

Upon intercepting the resource request, the authorization cache manager 34 looks for information pertinent to the request in an onboard cache. Thus, the authorization cache manager 34 looks into the cache for information on the requested resource based on any of the necessary security or authorization parameters.

If it finds the requested resource record based on any combination of authorization parameters, it simply allows or denies access to the resource based on the hit in the cache. Otherwise, the authorization cache manager 34 allows the preexisting authorization process to run to completion.

The entries in the cache are based on subsequent access requests. As such, the authorization cache manager 34 "learns" from previous access request activity. Thus, when a result is not in the cache as described above, the authorization cache manager 34 adds the result to the cache. Thus, when the same or related request is seen again, the authorization process need not run to completion.

This enables the reuse of previously made authorization decisions. This yields substantial reductions in authorization processing and enhances performance.

Figure 2:
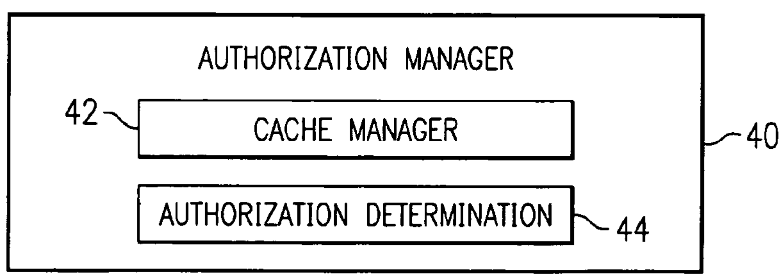
FIG. 2 is schematic logical diagram of an embodiment of the authorization manager of FIG. 1.

FIG. 2 is schematic logical diagram of an embodiment of the authorization manager of FIG. 1. The authorization manager 40 contains cache manager 42 and authorization protocol 44. The incoming request is intercepted by the authorization manager 40 and directed to the cache manager 42.

When the cache manager cannot find a hit in the authorization cache, the request is directed to the authorization protocol 44. The authorization protocol 44 then determines the authorization characteristics of the requested resource. As the result is returned, the result is also communicated to the cache manager for storage in the cache.

Figure 3:
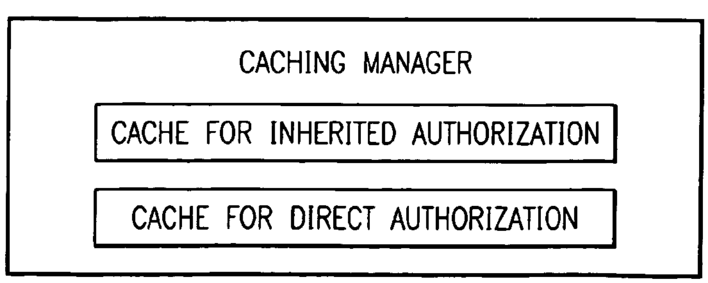
FIG. 3 is a block diagram of an exemplary authorization cache manager of FIG. 1.

FIG. 3 is a block diagram of an exemplary cache manager of FIG. 2. In this case, the cache is bifurcated into an inherited cache and a direct cache. This is because the inherited cache typically has a much larger population than that of the direct characteristics cache population. In this case, different caching methodologies may be implemented for each cache, and the authorization cache manager may be tuned for population size characteristics.

Figure 4:
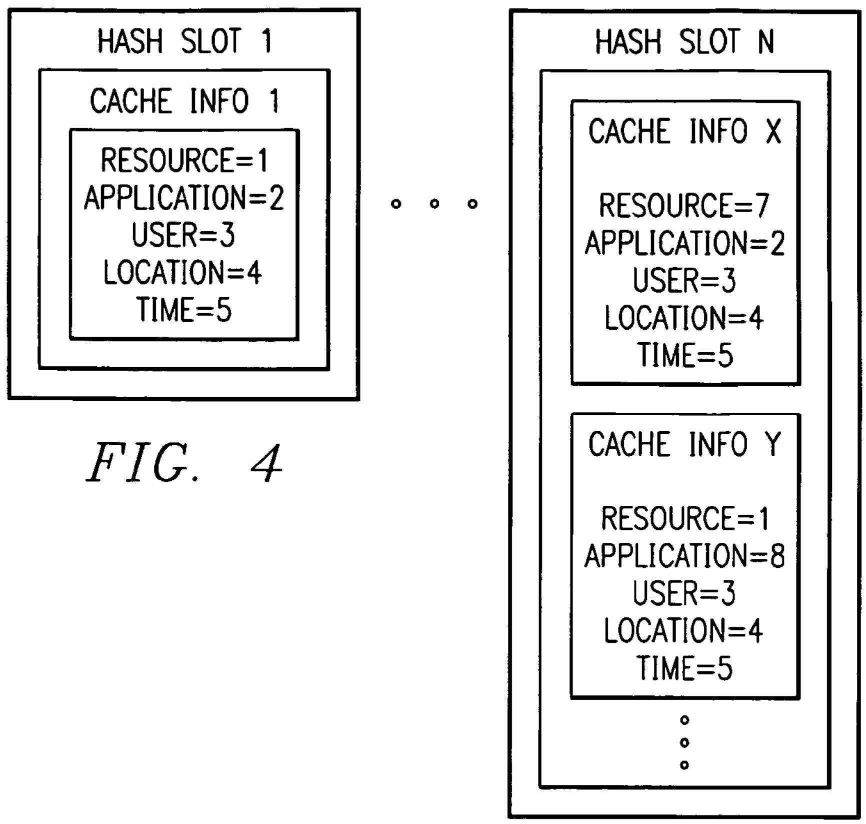
FIG. 4 is a schematic diagram of how a cache of the authorization cache manager of FIG. 1 may be implemented.

FIG. 4 is a schematic diagram of how a cache of the authorization cache manager of FIG. 1 may be implemented. The authorization structure values are hashed to form a table. Thus, the authorization request authorization parameters may be put into a hash function to determine which table to search, thus minimizing search times. In this case, an authorization cache entry might be of the form:

```
struct result {
    struct result *next;/* next result in hash */
    struct result *lru; /* for lru recycling, etc */
    struct FID *rFID; /* resource FID data */
    int userId;          /* accessing user id */
    int allowedActions /* granted actions (permissions) */
    int denyActions /* denied actions (restrictions) */
    int expireTime       /* when the entry expires */
    struct FID *appFid; /* FID of accessing application's binary file */
};
```

If the resource contains time-based policy, then its life in the cache is restricted to a time within the semantic limits of the security policy. If accessing application rules exist, then granted application information is stored. Otherwise, this is wild carded to apply to all applications.

Knowledge of how the resource was selected is used to cache the item in the most effective manner. For example, inherited policy would be expected to apply to a large collection of resources and likely would be the most frequently applied. Therefore, the cache for inherited cases might be larger and highly optimized for performance.

Once cached, the result becomes available for potential use in future accesses. The primary keys to locate a cached result are the resource's FID, the accessing user, and the accessing application if application based policy applies to the resource. With this information, the entry can be quickly found and checked to see if the requested actions are allowed. If so, then the access can be granted without consulting the security manager saving considerable processing against the resource's full security policy.

If the security manager runs in another system process or thread, or across a network, the cost savings are substantial. The AZN caching component also contains mechanisms to invalidate cached results in the event of changes to security policy. If policy changes on a protected resource, the security manager notifies the result cache, which then proceeds to flush all results for the affected resource. A future access on flushed resources will result in a call to the security manager for an authorization decision.

Figure 5:
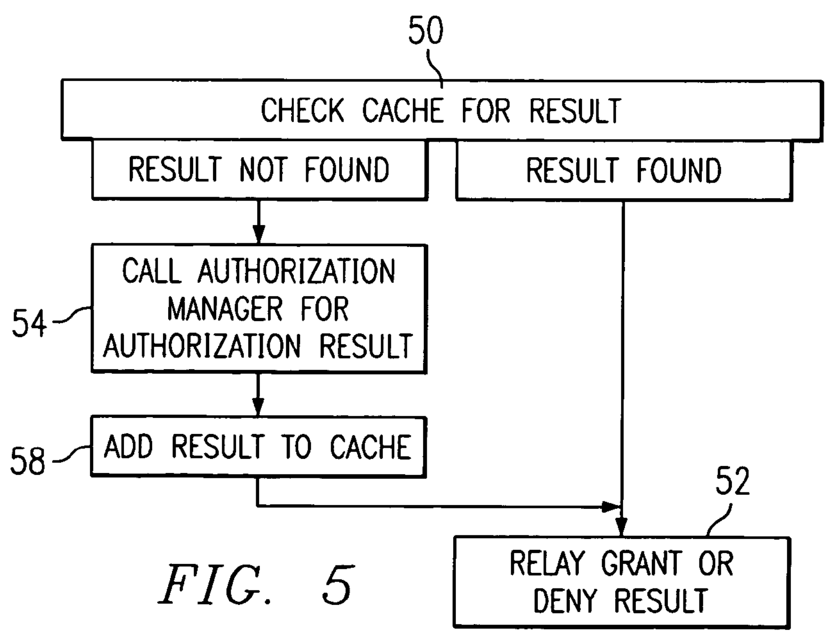
FIG. 5 is a block diagram of a system implementing the authorization cache manager of FIG. 1.

FIG. 5 is a block diagram of a system implementing the authorization cache manager of FIG. 1. In a block 50, the authorization cache manager checks the cache. If the result is found, the request is denied or granted based on the cached result in a block 52.

If a result is not found, an authorization determination protocol is initiated a block 54. The result of the decision is cached in the block 56, and the denial or granting of the request based on the protocol is relayed in the block 52.

Figure 6:
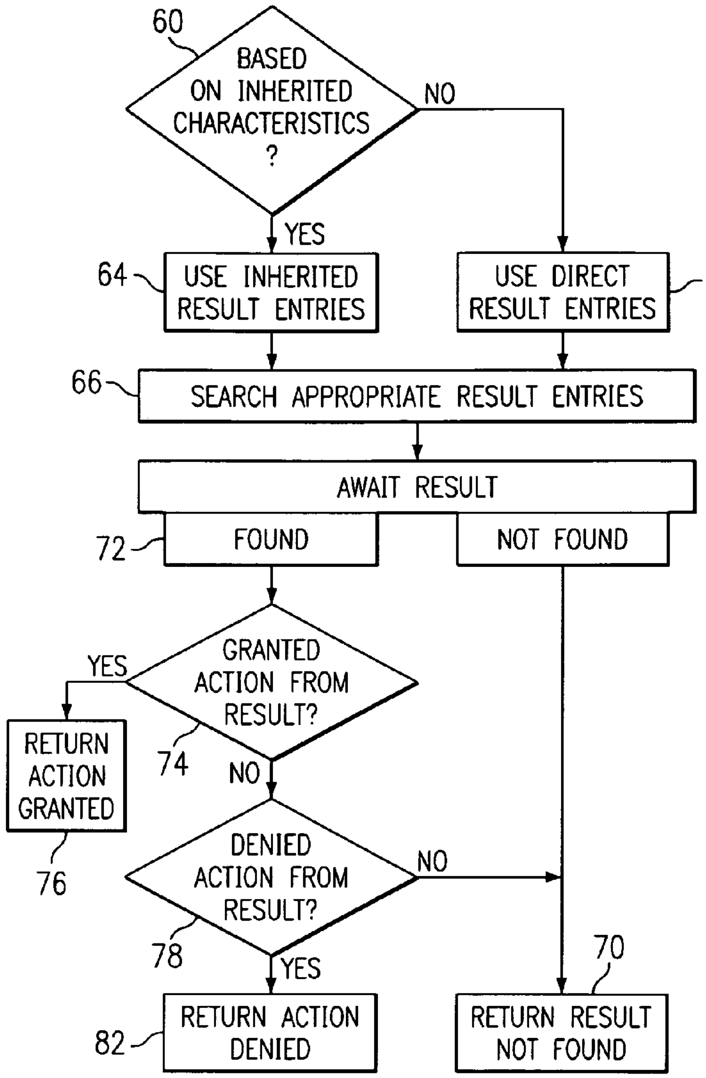
FIG. 6 is a block diagram of a system implementing the authorization cache manager of FIG. 1 when based on possible inherited characteristics.

FIG. 6 is a block diagram of a system implementing the authorization cache manager of FIG. 1 when based on possible inherited characteristics. In a block 60, the resource is checked if the authorization is based on inherited characteristics. If not, in the direct results cache entries are used in a block 62. If so, the inherited results cache entries are used in a block 64.

The appropriate cache is searched in a block 66. If no result is found in the cache, control runs through to a block 70 that reports that a result was not found.

Otherwise control runs to a block 72 when a result is found. In a block 74, a decision is made whether the requested action was a granted action. If the requested action is a granted action, the access is granted in a block 76. Otherwise in a block 78, a decision is made whether the requested action was a denied action. If not, the search is returned as not finding a result in a block 70. Otherwise, access is denied to the resource in a block 82.

Figure 7:
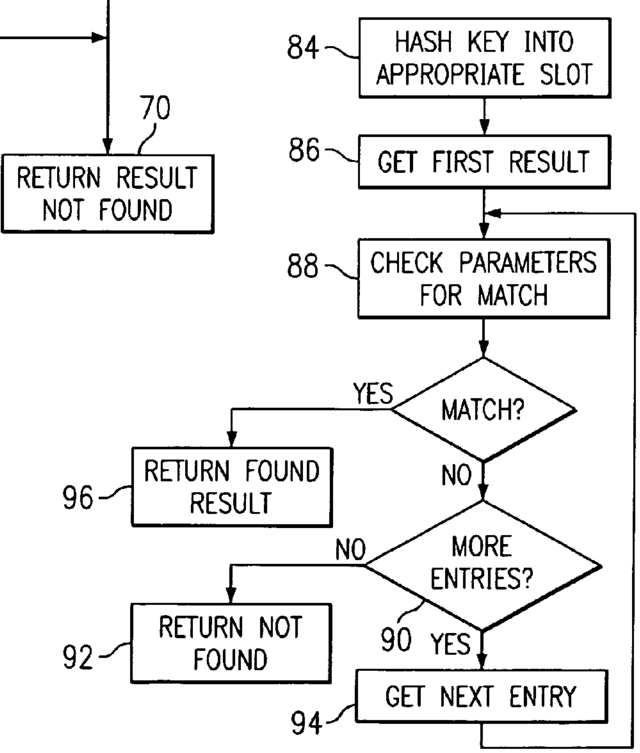
FIG. 7 is a block diagram of a method that exemplifies a method that could be used in the authorization cache manager of FIG. 1 to find access privileges for certain parameters in a resource request.

FIG. 7 is a block diagram of a method that exemplifies a method that could be used in the authorization cache manager of FIG. 1 to find access privileges for certain parameters in a resource request. In a block 84, the FID is hashed to find an entry into the hash table. It should be noted that one or more other parameters could be used alone or in combination for this hash function.

In a block 86, the first entry in a linked list of cached entries is accessed. The appropriate parameters are checked in a block 88 as to whether this entry pertains to the request. If not, the end entry is checked in a block 90. If this is the last entry, then a result of "not found" is returned in a block 92. Otherwise the next entry is selected in a block 94.

When the appropriate entry is found in the block 88, a pointer to the structure is returned in a block 96. Additionally, data on the structure may be returned as well.

Figure 8:
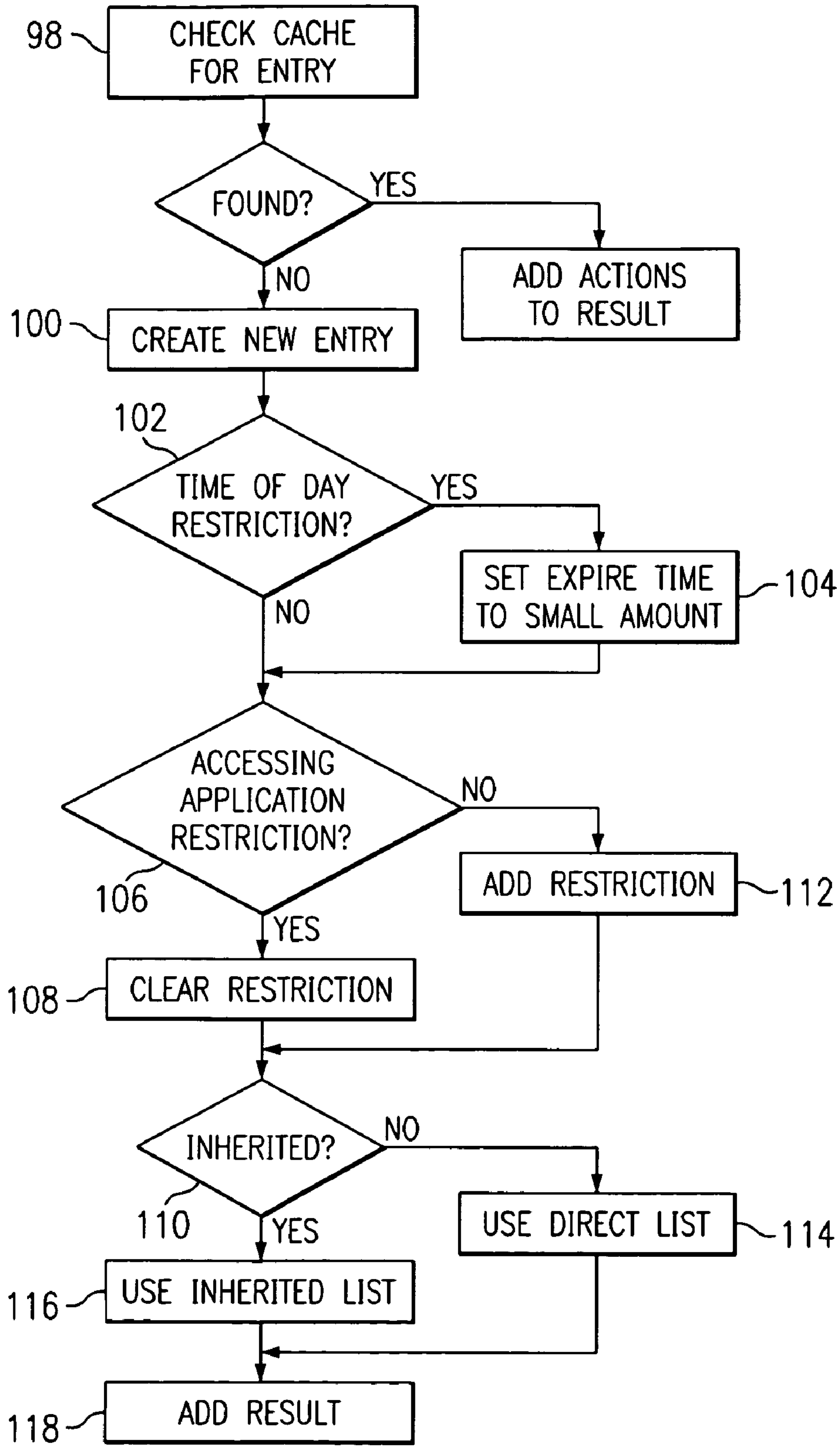
FIG. 8 is a block diagram implementing the addition of results to the cache for the authorization cache manager of FIG. 1.

FIG. 8 is a block diagram implementing the addition of results to the cache for the authorization cache manager of FIG. 1. In a block 98, the cache is checked for an existing entry. If the entry is found, the new granted or denied results are placed in the structure.

If the entry is not found, a new entry is created in a block 100. Time of day attributes are checked in a block 102. If so, the expire time is set to a small amount in a block 104. Control then passes to a block 106.

If the new entry does not have time of day rules, the control runs directly to the block 106. There the application policies for the resource are checked. If they do not exist, the entry is cleared in a block 108, from which control passes to a block 110. If the policies do exist, then the FID of the application is placed in the entry in a block 112. From there control passes to the block 110.

In the blocks 110, 114, and 116, the appropriate information is added on whether the resource is selected as a direct or an inherited policy. In a block 118, the entry is added to the appropriate cache slot.

Thus, architecture for implementing a cached authorization infrastructure is described. It should be noted that such architecture might be implemented with a computing device. The computing device may be a general purpose or specialized computing device. It should also be noted that the architecture might be implemented as software run on the computing device and within such components as magnetic media or computer memory associated with the computing device. In another embodiment, the architecture may be implemented in or as hardware implementations.

In view of the above detailed description of the present invention and associated drawings, other modifications and variations will now become apparent to those skilled in the art. It should also be apparent that such other m odifications and variations may be effected without departing from the spirit and scope of the present invention as set forth in the claims which follow.

What is claimed is:

1. A computer system that determines authorization privileges for resources for a user, the system comprising:

a file system on which the resources reside;

a first software; and the first software acting to:

intercept an authorization request from the user for a particular resource;

search a cache to determine if the resource may be accessed by the user, the cache containing results of prior authorization requests, wherein the cache comprises an inherited cache portion and a direct cache portion, and wherein a determination is made as to which of the inherited cache portion and the direct cache portion to access; and selectively authorize or deny the use of the resource based upon a result of the search of the cache.

2. The computer system of claim 1 wherein the first software authorizes or denies the use of the resource based upon one or more predetermined parameters, wherein the cache comprises both a grant field and a deny field which are used by the first software to determine whether to grant or deny the use of the resource.

3. The computer system of claim 1 wherein the first software authorizes or denies the use of the resource based upon one or more predetermined parameters, the one or more predetermined parameters comprising a requesting resource identifier of a resource requesting the particular resource.

4. The computer system of claim 2, the one or more predetermined parameters comprising a user ID.

5. The computer system of claim 2, the one or more predetermined parameters comprising a time indicating lifetime of a given resource entry in the cache.

6. The computer system of claim 1 wherein the search of the cache is based on a key, the key derived from hashing one or more search parameters.

7. The computer system of claim 6, the one or more search parameters comprising an FID.

8. The computer system of claim 1, the first software further acting to initiate an authorization protocol that determines an authorization status of the resource when the search of the cache of authorization requests fails to reveal any previous requests.

9. The computer system of claim 8, wherein the results of the authorization protocol to determine an authorization status of the resource are added to the cache, wherein a determination is made as to which of the inherited cache portion and the direct cache portion to add the results to.

10. A method to determine authorization privileges for resources for a user of a computer system, the method comprising:

intercepting an authorization request for access from the user for a particular resource;

hashing at least a portion of the authorization request to generate a hash value;

searching a cache of prior authorization requests to determine if the resource may be accessed, wherein the cache comprises a plurality of tables and a given one of the plurality of tables is selected based on the hash value; and if a hit is made in the cache, selectively deciding the authorization request based at least in part on information found in the cache.

11. The method of claim 10 further comprising:

determining the resource authorization based upon predetermined parameters associated with the request, wherein the predetermined parameters comprise granted actions and denied actions maintained in the tables.

12. The method of claim 10, further comprising determining the resource authorization based upon predetermined parameters associated with the request, wherein the predetermined parameters comprise an expire time of when a given entry in the cache expires.

13. The method of claim 10, further comprising determining the resource authorization based upon predetermined parameters associated with the request, wherein the predetermined parameters comprise an identifier of an accessing application's binary file.

14. The method of claim 11, the predetermined parameters comprising a time indicating lifetime of a given resource entry in the cache.

15. The method of claim 10 wherein an outcome of the step of searching is based at least in part upon an FID.

16. The method of claim 10 further comprising:

initiating an authorization protocol to determine an authorization status of the resource when the step of searching fails to reveal any requests.

17. The method of claim 16 further comprising:

saving in the cache the results of the authorization protocol to determine an authorization status of the resource, wherein the cache comprises an inherited cache portion and a direct cache portion, and wherein a determination is made as to which of the inherited cache portion and the direct cache portion to add the results to.

18. A computer program product on a computer useable medium, the computer usable medium having a computer usable program embodied therein for preprocessing an incoming request for information from a user over network, the information stored on one or more source servers communicatively coupled to a computing system, the computer usable program including:

instructions for intercepting an authorization request for access from the user for a particular resource;

instructions for searching a cache of prior authorization requests to determine if the resource may be accessed; and instructions for selectively deciding the authorization request based at least in part on information found in the cache, wherein the authorization request comprises an identifier of an application that generated the authorization request.

19. The computer program product of claim 18 further comprising:

instructions for determining the resource authorization based upon one or more predetermined parameters associated with the request.

20. The computer program product of claim 19, the one or more predetermined parameters comprising a requesting resource identification from a previous authorization request.

21. The computer program product of claim 18, wherein the cache comprises an inheritance cache portion and a direct cache portion, and further comprising instructions for determining which of the inherited cache portion and the direct cache portion to access.

22. The computer program product of claim 19, the one or more predetermined parameters comprising a time indicating lifetime of a given resource entry in the cache.

23. The computer program product of claim 18 wherein an outcome of the instructions for searching is based at least in part upon an FID.

24. The computer program product of claim 18 further comprising:

instructions for initiating an authorization protocol to determine an authorization status of the resource when the instructions for searching fail to reveal any requests.

25. The method of claim 24 further comprising:

instructions for saving in the cache the results of the authorization protocol to determine an authorization status of the resource, wherein the cache comprises an inherited cache portion and a direct cache portion, and further comprising instructions for determining which of the inherited cache portion and the direct cache portion to add the results to.

* * * * *